Sept. 22, 1936. W. H. CHURCHILL 2,055,427
MOLDING AND LIKE FASTENER INSTALLATION AND FASTENER FOR THE SAME
Filed July 11, 1934
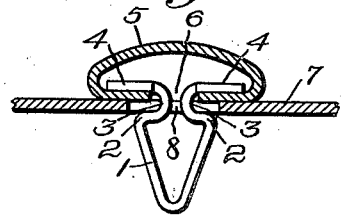
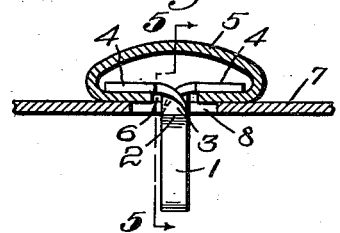
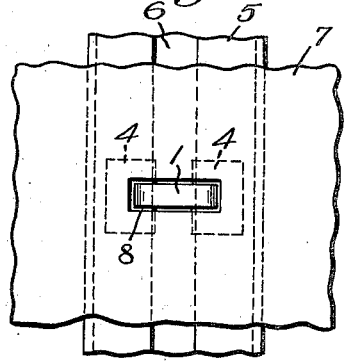
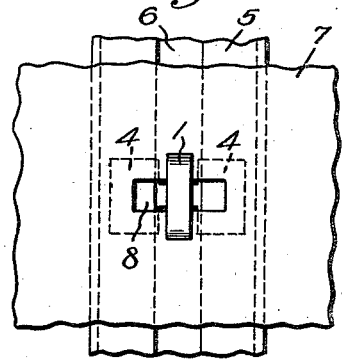
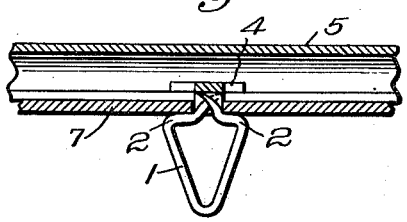
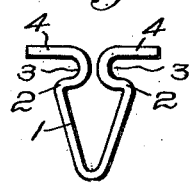
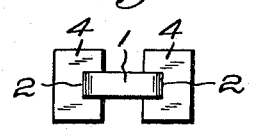
Inventor:
Wilmer H. Churchill
by Walter S. Jones
Atty.

Patented Sept. 22, 1936

2,055,427

UNITED STATES PATENT OFFICE 2,055,427

MOLDING AND LIKE FASTENER INSTALLATION AND FASTENER FOR THE SAME

Wilmer H. Churchill, Saugus, Mass., assignor to United-Carr Fastener Corporation, Cambridge, Mass., a corporation of Massachusetts Application July 11, 1934, Serial No. 734,643

1 Claim. (Cl. 189—88)

My invention aims to provide improvements in fastener-secured installations and fasteners for the same.

In the drawing, which illustrates a preferred embodiment of my invention:—

Figure 1 is a transverse section through an installation including a preferred form of my invention in position to be locked;

Fig. 2 is a section through the same installation with my improved fastener in locked position;

Fig. 3 is a rear elevation of the assembly before locking, as shown in Fig. 1;

Fig. 4 is a rear elevation of the assembly, as shown in Fig. 2;

Fig. 5 is a section taken on the line 5—5 of Fig. 2;

Fig. 6 is a side elevation of the fastener per se; and

Fig. 7 is an end view of the fastener shown in Fig. 6.

My invention as illustrated in the accompanying drawing relates particularly though not exclusively to a fastener-secured installation whereby molding strips and the like are quickly and simply attached to a supporting structure, such as an automobile body, by means of a novel fastener.

Referring first to the fastener per se, as illustrated in Figs. 6 and 7, I have shown a simple and sturdy device formed from a single strip of sheet metal. The sheet metal strip is preferably bent in the middle and portions formed into the shape of a triangle I with one side incomplete (Fig. 6). Two corners 2—2 of this triangular portion form shoulders, the purpose of which will be more fully described.

The end portions of the strip are curved toward each other to form a relatively narrow neck portion 3—3, whence extend a pair of arms 4—4, in opposite directions and at right angles to the neck. The ends of the arms may be wider than the main body of the fastener as in Fig. 7, so that the arms will have a firmer grip on the supporting structure. The neck 3—3 is preferably left narrow so that it may be readily twisted to permit the shoulders 2—2 to be turned to a position at right angles to the arms 4—4 (Figs. 2 and 4).

The particular parts chosen to illustrate the use of my improved fastener include a molding strip, such as is now frequently used on the bodies of automobiles and elsewhere, and a relatively thin supporting member. It should be understood, however, that this is not the sole use of my improved fastener and that it may be used to fasten other parts together.

The molding strip 5 is of the type having an aperture 6 running the whole length of one of its sides, of a width great enough to permit passage of the neck portions 3—3 of the fastener. This continuous aperture permits adjustment of the fastener in any desirable position. The supporting member 7 is of relatively thin material with an aperture 8 elongated to receive the shoulders 2—2 of the fastener. The aperture 8 should run in a direction transverse to the aperture 6 of the molding strip.

Assembly of the component parts of the installation is a relatively simple matter and may be effected by first sliding into the molding, from one or both ends, the arms of as many fasteners as there are apertures 8 in the supporting member 7. The next step is to insert the shoulder portions of the fasteners through their respective apertures 8. Then with a pair of pliers or other suitable instrument the shoulders are turned through an angle of 90°, more or less, so that the shoulders lie on a line at right angles to the line of the arms 4—4, thus engaging the supporting member 7. When the shoulders are turned, the widened arms are held in their original position by the sides of the molding strip, and the turning motion twists the material of the neck (Figs. 2 and 5) between the arms and the shoulders. Naturally this twisting of the metal tends to shorten the neck and bring the shoulders nearer to the arms. This is of course a much desired result, since it makes the fastening more secure. It will be seen from the above that each aperture 8 must be shorter crosswise of its length than the distance between the outer ends of the shoulders, the ideal length being just great enough to receive the fastener in the unlocked position, as shown in Fig. 3. If at any time it becomes necessary to disengage the molding strip from its supporting member, the shoulders are turned back into line with the slot 8 by untwisting the neck and the molding strip may be easily removed.

While I have illustrated and described a preferred form of my invention, I do not wish to be limited thereby, as the scope of my invention is best defined by the following claim.

I claim:

An installation of the class described comprising, in combination, a hollow molding strip and like installation having an extended continuous longitudinal aperture, a fastener member having a pair of oppositely extending flat arms within said molding strip and having free ends adjacent to the inner longitudinal sides of said molding strip to engage therewith and prevent relative rotation, said arms being generally rectangular in shape and having a distance between a corner of one arm and the diagonally opposite corner of the other arm greater than the distance between opposite inner longitudinal sides of said molding, a portion connecting said arms and extending through said aperture, a supporting member to which said molding strip is attached, said supporting member having a slot therethrough transverse to the slot in said molding strip, and said connecting portion formed to provide a neck, the portions of which are relatively close to each other, and a loop-shaped extension, a pair of shoulders adjacent to said neck and spaced by said neck from said arms, said loop-shaped portion and neck passing through the slot in said supporting member and the neck being twisted whereby said shoulders are engaged with said supporting member to hold the molding strip in position.

WILMER H. CHURCHILL.